Oct. 28, 1941.  T. N. FRITZSCH  2,260,775
ELECTRIC WELDING
Filed Jan. 3, 1939
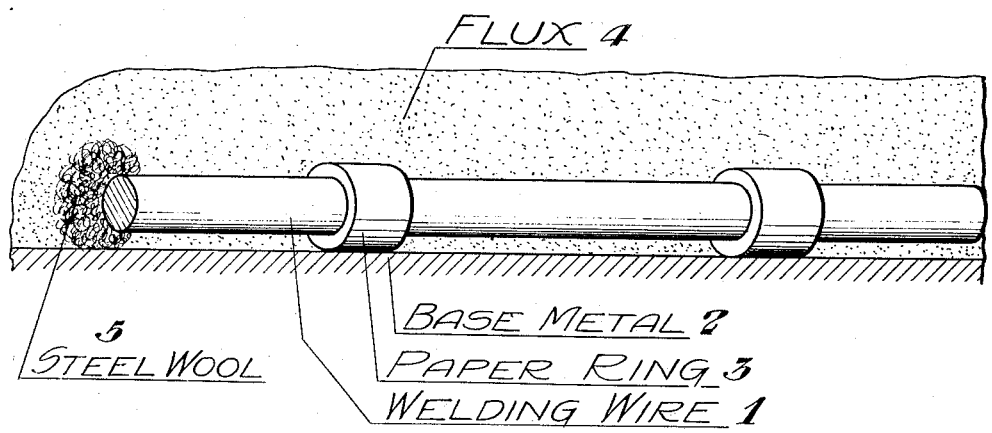
Inventor:
THEODORE N. FRITZSCH,
by John E Jackson
his Attorney.

Patented Oct. 28, 1941

2,260,775

UNITED STATES PATENT OFFICE 2,260,775

ELECTRIC WELDING

Theodore N. Fritzsch, Johnstown, Pa.

Application January 3, 1939, Serial No. 249,068

2 Claims. (Cl. 219—10)

This invention relates to electric welding, one of the objects being to weld automatically without using automatic welding machines.

Welding conducted in accordance with this invention includes supporting welding wire in parallel, spaced relation respecting the metal to receive the weld and free from electric contact with this metal, covering the wire and metal with welding flux that is practically electrically non-conductive when cold and which is a high-resistance electric conductor when hot, heating a localized portion of the flux to cause it to become a high-resistance electric conductor at this portion, passing electric current by way of the wire and metal through this portion of the flux to effect electric resistance heating thereof and welding action between the wire and metal, and maintaining the passage of electric current so that the heating and welding action progresses from the locally heated portion of the flux.

It is to understood that the composition of the welding wire used depends on what is required to properly bond with the particular metal which receives the weld. Furthermore, the composition of the welding flux should be varied to meet the welding conditions encountered. These matters, as well as the size of the welding wire, its distance from the metal to receive the weld and the electric current characteristics, are variables which must be adjusted. A skilled welder is capable of making such an adjustment.

Continuing, welding following the principle of this invention includes the use of welding wire which, throughout its length, is in electric contact with the flux described, this flux being heated by thermal conduction as the welding progresses, to progressively and gradually become a high-resistance electric conductor through which proportionate portions of the electric current pass to effect progressive and gradual preheating of the metal receiving the weld, in advance of the welding action. The spaced relation of the wire respecting the metal, and the characteristics of the flux and electric current, should be adjusted so that the welding action progresses in proportion to the progress of such preheating. In the event the preheating action is not desired, it may be retarded by insulating the welding wire from the flux with a covering that is destructible only at actual welding temperatures.

The foregoing is illustrated by the accompanying drawing.

In this drawing the welding wire 1 is spaced from the metal 2 to receive the weld, by means of a series of paper rings 3 spaced along the length of the welding wire 1. The flux covering the wire and metal is indicated at 4. The steel wool 5, illustrated at one end of the welding wire 1, functions to heat a localized portion of the flux when current is applied to the wire and metal, it providing a high-resistance electric path when cold and serving to initiate the progress in welding action.

I claim:

1. A welding process including supporting welding wire in parallel spaced relation respecting the metal to receive the weld and free from electric contact with said metal, covering said wire and said metal with welding flux that is practically electrically non-conductive when cold and which is a high-resistance electric conductor when hot, heating a localized portion of said flux to cause it to become a high-resistance electric conductor at said portion, passing electric current by way of said wire and said metal through said portions of said flux to effect electric resistance heating thereof and welding action between said wire and said metal, and maintaining said passage of electric current so that said heating and said welding action progresses from said portion of said flux, said wire throughout its length being in electric contact with said flux and the latter being heated by thermal conduction to progressively and gradually become a high-resistance electric conductor through which proportionate portions of said current pass to effect progressive and gradual preheating of said metal in advance of said welding action.

2. A welding process including supporting welding wire in parallel spaced relation respecting the metal to receive the weld and free from electric contact with said metal, covering said wire and said metal with welding flux that is practically electrically non-conductive when cold and which is a high-resistance electric conductor when hot, heating a localized portion of said flux to cause it to become a high-resistance electric conductor at said portion, passing electric current by way of said wire and said metal through said portions of said flux to effect electric resistance heating thereof and welding action between said wire and said metal, and maintaining said passage of electric current so that said heating and said welding action progresses from said portion of said flux, said wire throughout its length being in electric contact with said flux and the latter being heated by thermal conduction to progressively and gradually become a high-resistance electric conductor through which proportionate portions of said current pass to effect progressive and gradual preheating of said metal in advance of said welding action, the spaced relation of said wire respecting said metal, and the characteristics of said flux and said electric current being adjusted so said welding action progresses in proportion to the progress of said preheating.

THEODORE N. FRITZSCH.